Sept. 12, 1961     S. D. BOYER     2,999,559
SPLATTER GUARD FOR FRYING PANS AND THE LIKE
Filed April 4, 1958

INVENTOR.
SAMUEL D. BOYER

ATTORNEYS

2,999,559
SPLATTER GUARD FOR FRYING PANS AND THE LIKE
Samuel D. Boyer, 15390 West U.S. 40, Golden, Colo.
Filed Apr. 4, 1958, Ser. No. 726,447
3 Claims. (Cl. 183—1)

This invention relates to cooking vessels and particularly to an improved cover or splash guard for frying pans and the like.

Various arrangements have been provided heretofore to minimize or prevent splashing of fat or other liquids from frying pans and other cooking vessels. These arrangements include covers made of materials such as metal screen and absorbent paper. It is an object of this invention to provide an improved splatter guard for frying pans and the like which is of simplified construction and provides a readily replaceable shield which is moisture pervious as well as grease absorbing.

It is another object of this invention to provide an improved and efficient splatter guard for frying pans and the like which employs a disposable paper member and also provides an effective flame guard to minimize the likelihood of burning or charring of the guard and ignition of the hot fat in the pan.

Further objects and advantages of this invention will become apparent as the following description proceeds and the features of novelty which characterize the invention will be pointed out with particularity in the claims annexed to and forming a part of this specification.

Briefly, in carrying out the objects of this invention in one embodiment thereof, a flat flanged ring is constructed to rest on the top edge of a frying pan and is provided with a downwardly extending flange about its outer periphery to prevent lateral displacement from the pan. The central opening of the ring has an upstanding flange on which rests a paper disc or plate having an integral rim or flange formed about its periphery of a size to fit about the central flange on the ring and hold the disc in place. The paper is selected to be sufficiently porous to allow the escape of water vapor or steam while preventing the splashing out of fat. The paper disc is self-sustaining and is held on the ring solely by its downwardly extending flange.

For a better understanding of this invention reference may be had to the accompanying drawing in which.

Figure 1:
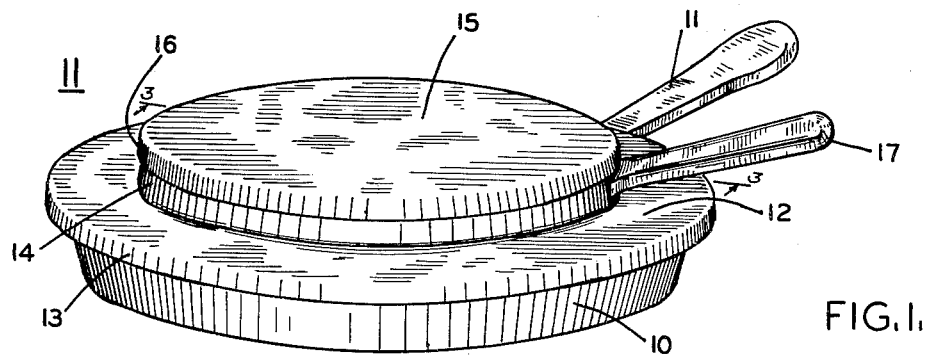
FIG. 1 is a perspective view of a frying pan provided with a splatter guard embodying the invention.
Figure 2:
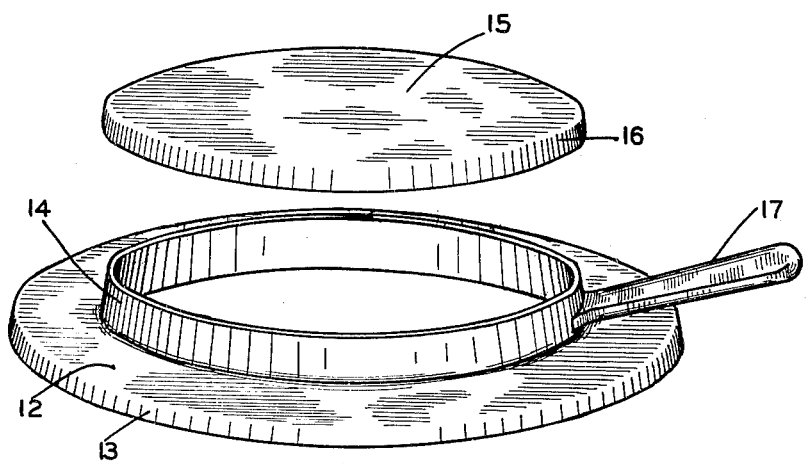
FIG. 2 is a perspective view of the splatter guard showing the cover disc displaced therefrom.

Referring now to the drawing, in FIG. 1 there is illustrated a frying pan 9 having a handle 10. In order to prevent the splattering of grease from the pan during the cooking operation, a cover assembly 11 embodying the invention is positioned on the pan 9. The assembly 11 includes a flat metal ring 12 of substantial width and which rests on the edge of the pan and is formed with a depending flange 13 to prevent lateral displacement of the ring from the pan. The ring is also provided with an upwardly extending flange 14 defining a large central opening over the pan. A cover of paper or other suitable fibrous or porous material, indicated at 15, rests on the flange 14 and has a down-turned edge or flange 16 which fits closely about the upwardly extending flange 14 and holds this disc in place on the cover assembly. Cover assembly 11 preferably is provided with a small handle 17 secured to the flange 14 so that the assembly may easily be positioned on the frying pan while the cooking operation is in progress.

The main or horizontal body portion of the ring 12 is made of substantial width so that the center opening of the ring is spaced from the outer periphery thereof a distance to minimize the effect of flame or hot gas rising around the outside of the pan and thus any liklihood of charring or burning of the cover disc 15 or of the fat within the pan is minimized.

The disc 15 may be made of any suitable material and it has been found that paper such as that employed for making paper towels is well suited for this purpose. The flange 16 of the cover is formed integrally with the body portion 15 and is made of a size to fit closely about the metal flange 14 of the ring 12. Various fibrous materials are suitable for use in making the cover, the material being selected so that it will readily afford the passage of water vapor or steam while acting to catch any particles of grease which are thrown up from the cooking within the pan. The arrangement of the flange or rim about the cover disc assures adequate support on the flange 16 and it has been found that the paper disc will be retained in place throughout the cooking operation regardless of its being soaked with grease. After the cooking operation has been completed, the used porous cover may be removed merely by tipping the ring over and allowing it to fall therefrom. This provides an extremely simple and useful arrangement for maintaining the splatter shield in position during cooking and for affording its removal afterward without the necessity of operating any locking or holding devices and without making it necessary for the cook to handle the greasy cover itself.

Figure 3:
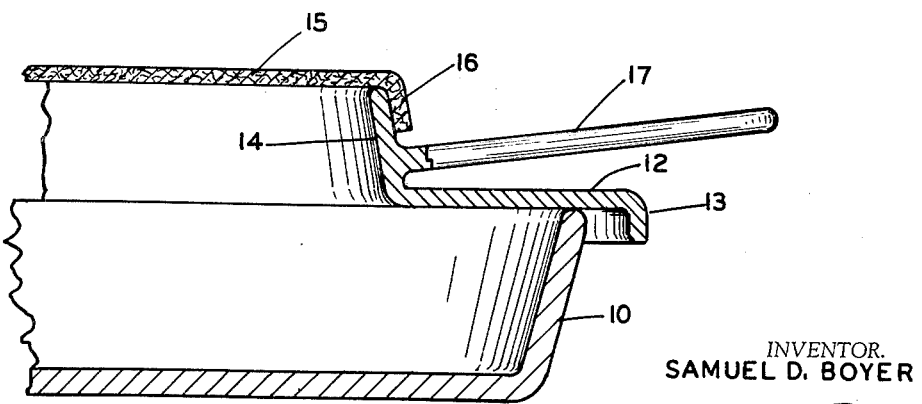
FIG. 3 is an enlarged sectional view of a portion of the pan and guard along the line 3—3 of FIG. 1.

It will be noted particularly in FIG. 3 that the wide ring portion of the cover assembly not only provides an adequate shield for preventing overheating of the cover and ignition of hot grease or smoke, but also makes it possible to employ the cover with a wide range of sizes of frying pans, it being clear that any frying pan having a diameter such that it will rest within the outer flange of the ring 12 and is larger than the center opening of the ring may be employed with this unit. In this figure the thickness of the sheet metal of the ring 12 and of the fibrous material of the disc 15 have been exaggerated for purposes of illustration.

While the invention has been described as applied to a particular type of cooking vessel, various other applications and changes in structural detail will occur to those skilled in the art. Therefore, it is not desired that the invention be limited to the details of construction illustrated and described, and it is intended by the appended claims to cover all modifications which fall within the spirit and scope of the invention.

I claim:

1. A splatter preventing cover for frying pans and the like comprising a substantially flat metal ring adapted to rest on the top edge of a pan, said ring having a downwardly extending flange about its outer periphery to prevent its lateral displacement from a pan on which it rests and an upwardly extending flange about its inner periphery and defining a large central opening, and a disc of disposable moisture pervious fibrous sheet material having a flange formed thereon about its outer periphery and fitting the outer wall of said upwardly extending flange for holding said disc in position on said ring, said disc being held in position by engagement of its flange about said upwardly extending flange whereby said disc falls from said ring when said ring is inverted.

2. A splatter preventing cover as set forth in claim 1 including a handle secured to said ring a distance below the top wall of said upwardly extending flange at least as great as the depth of said flange formed on said disc.

3. A splatter preventing cover as set forth in claim 1 wherein said ring is sufficiently wide to act as a flame shield and to afford accommodation of said cover on pans within a substantial range of diameters.

References Cited in the file of this patent

UNITED STATES PATENTS

| | | |
|---|---|---|
| D. 31,464 | Hinoult | Aug. 29, 1899 |
| 1,436,606 | Ritter | Nov. 21, 1922 |
| 1,942,900 | Peters | Jan. 9, 1934 |
| 2,524,554 | White | Oct. 3, 1950 |
| 2,587,773 | Sell et al. | Mar. 4, 1952 |
| 2,751,901 | Livermore | June 26, 1956 |